(12) United States Patent
Tenbrock et al.

(10) Patent No.: US 7,563,193 B2
(45) Date of Patent: Jul. 21, 2009

(54) METHOD FOR ACTUATING THE TRANSMISSION OF A MOTOR VEHICLE HAVING A HYBRID DRIVE MECHANISM AND ACTUATION DEVICE FOR APPLYING THE METHOD

(75) Inventors: Friedrich Tenbrock, Langenargen (DE); Ralf Dreibholz, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 392 days.

(21) Appl. No.: 11/542,991

(22) Filed: Oct. 4, 2006

(65) Prior Publication Data

US 2007/0082780 A1    Apr. 12, 2007

(30) Foreign Application Priority Data

Oct. 6, 2005    (DE) .................. 10 2005 047 891

(51) Int. Cl.
*H02P 17/00*    (2006.01)
*B60K 1/00*    (2006.01)

(52) U.S. Cl. .................. 477/16; 180/65.4; 903/907; 903/943

(58) Field of Classification Search ............. 903/903, 903/907, 943; 477/15, 16, 2, 3, 7; 180/65.3, 180/65.4; 74/473.21–473.29
See application file for complete search history.

(56) References Cited

U.S. PATENT DOCUMENTS

| | | | |
|---|---|---|---|
| 4,934,496 A | 6/1990 | Barske et al. | |
| 5,923,093 A | 7/1999 | Tabata et al. | |
| 6,007,451 A | 12/1999 | Matsui et al. | |
| 6,322,477 B1 | 11/2001 | Eich et al. | |
| 6,565,473 B2 | 5/2003 | Endo et al. | |
| 2005/0028633 A1 | 2/2005 | Giefer et al. | |

FOREIGN PATENT DOCUMENTS

| | | | |
|---|---|---|---|
| DE | 36 17 256 A1 | 11/1987 | |
| DE | 40 11 033 A1 | 10/1990 | |
| DE | 199 46 335 A1 | 4/2000 | |
| DE | 102 49 074 A1 | 5/2004 | |
| EP | 1 182 381 A2 | 2/2002 | |
| JP | 2005105950 A | * | 4/2005 |

* cited by examiner

*Primary Examiner*—Tisha D Lewis
(74) *Attorney, Agent, or Firm*—Davis & Bujold, P.L.L.C.

(57) ABSTRACT

A method for actuating the transmission of a motor vehicle having a hybrid drive mechanism, especially for the case when an electric accumulator is loaded via the internal combustion engine and the selector lever (1) is locked electronically or via a mechanical selector lever locking device during the loading operation. Regarding the selector lever actuation, the driver's wish is detected by way of a sensor device (3) and when it is determined that the drive is going to activate a running step by the sensor device (3), the loading operation of the electric accumulator is immediately discontinued, via the internal combustion engine, and an operating state is adjusted which allows a safe activation of a transmission running step and subsequently the lock of the selector lever (1) is released or the selector lever locking device (2) is unlocked.

8 Claims, 1 Drawing Sheet

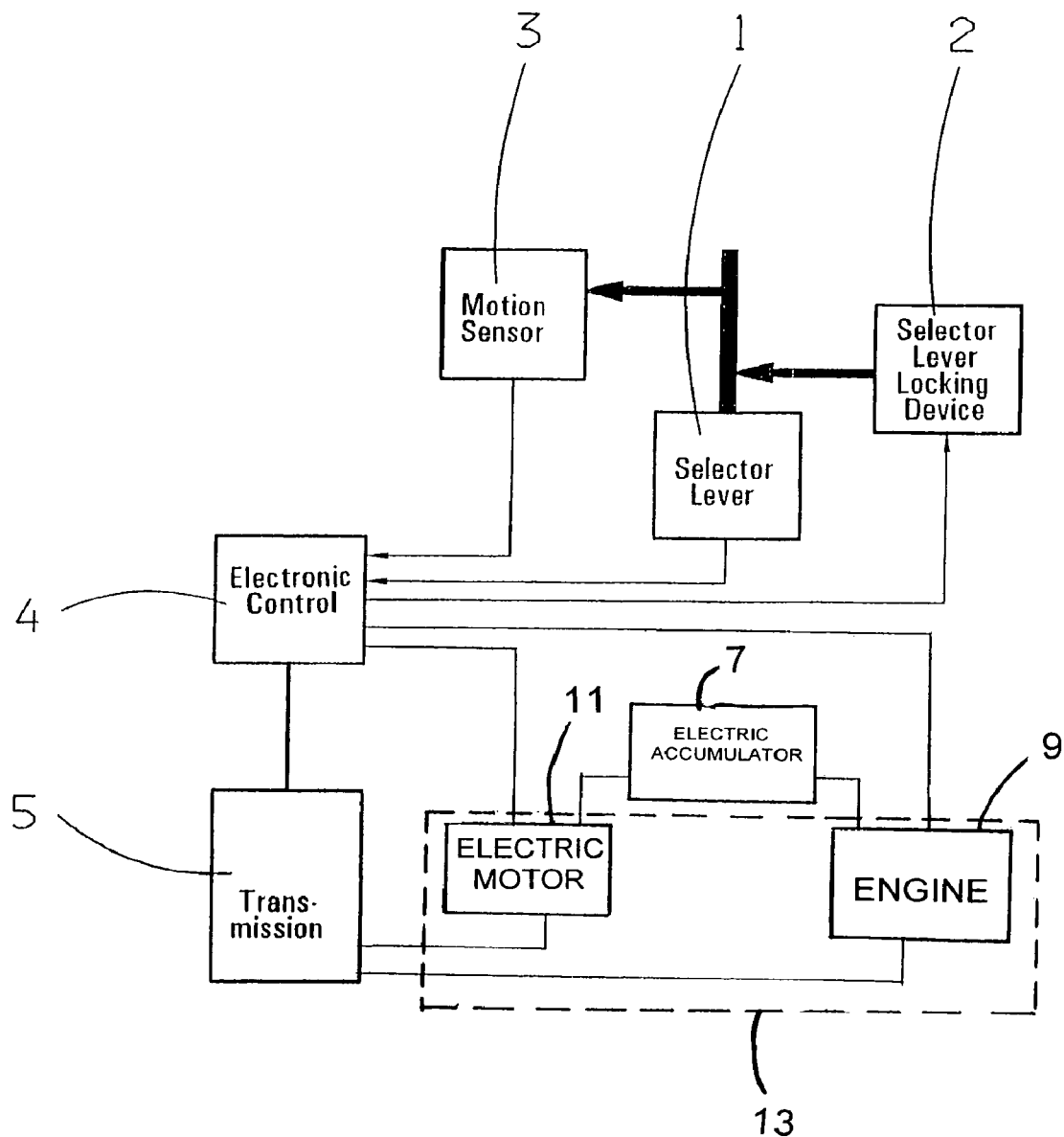

METHOD FOR ACTUATING THE TRANSMISSION OF A MOTOR VEHICLE HAVING A HYBRID DRIVE MECHANISM AND ACTUATION DEVICE FOR APPLYING THE METHOD

This application claims priority from German Application Ser. No. 10 2005 047 891.3 filed Oct. 6, 2005.

FIELD OF THE INVENTION

This invention relates to a method for actuating the transmission of a motor vehicle having a hybrid drive mechanism and to an actuation device for applying the method.

BACKGROUND OF THE INVENTION

Vehicles having a hybrid drive mechanism are known from the prior art.

As a prime mover is mainly used here, an internal combustion engine which makes the required power available over a wide range. In addition, in drive mechanisms of this kind, an electric machine (electric motor) is provided which offers the advantages of an electric drive mechanism, such as the use of brake energy and the emission freedom when driving at low vehicle speeds.

In a vehicle having hybrid drive mechanism, conventional automatic transmissions and appertaining selector levers, there essentially arises the following problem in the neutral or parking position of the selector lever.

If the electric accumulator of the vehicle is actually loaded, via the internal combustion engine, engagement of a running step, due to the elevated engine power associated therewith, ought not to result since this would possibly lead to undesired acceleration.

This undesired operation can be easily eliminated by way of a conventional selector lever locking device. The driver's wish is disadvantageously no longer detected by the system due to the blocking of the selector lever. This means that the driver has to wait until the loading operation of the loading system is terminated which, according to system and loading power, can last seconds or minutes severely impairing comfort.

Selector lever locking devices are known from the prior art. The Applicant's DE 40 11 033 A1 discloses, for example, a lock, dependent on engine rotational speed, for preventing inadmissible downshifts in variable gear transmissions.

One other locking device has been described in the contents of DE 102 49 074 A1 and is formed by a stop of the housing and an intermediate piece located upon the gate between the selector lever and the stop. Another mechanical lock is described in U.S. Pat. No. 6,007,451. It makes the activation of a running step possible when the ignition is switched in.

The problem on which this invention is based is to outline a method for actuating the transmission of a motor vehicle comprising a hybrid drive mechanism by a method application which prevents the above mentioned disadvantages known from the prior art. It must particularly be ensured that the driver's wish is implemented without delay. An actuation device for applying the method is also to be outlined.

SUMMARY OF THE INVENTION

A method for actuating the transmission of a motor vehicle having a hybrid drive mechanism is accordingly proposed, especially for the case that the electric accumulator is loaded, via an internal combustion engine, and the selector lever is electronically locked or, via a mechanical selector lever locking device, during the loading operation within the scope of which the driver's wish is detected in relation to the selector lever actuation by way of a sensor device wherein, when it has been determined by the sensor device that the driver is going to activate a running step, the loading operation of the electric accumulator is immediately shut off, via the internal combustion engine, and an operating state is adjusted, which allows a safe activation of a transmission running step. If the safe operating state is adjusted, the electronic lock of the selector lever is immediately released or the selector lever locking device is unlocked.

For the case that the vehicle has a mechanical selector lever locking device, an actuation device is proposed which comprises a sensor device, disposed in parallel with the mechanical selector lever device, and senses the driver's wish with regard to the selector lever actuation despite the locking of the selector lever by the mechanical selector lever locking device against the activation of a running step.

BRIEF DESCRIPTION OF THE DRAWING

The invention will now be described, by way of example, with reference to the accompanying drawing in which:

The sole FIGURE shows a diagrammatic representation of the actuation device.

DETAILED DESCRIPTION OF THE INVENTION

In the FIGURE, a selector lever is designated by numeral 1, the selector lever locking device 2, a sensor device 3, which can be designed as a motion sensor and an electronic control 4, required for processing the signals of the sensor device and a transmission 5. Within the scope of an advantageous embodiment of the invention, the sensor device can be designed as a switch parallel with the mechanical release knob of the selector lever locking device 2.

For systems having no mechanical selector lever device, but having an electronic selector lever lock, for example, shift-by-wire systems, an actuation device is proposed which has adequate optical or contact sensors relative to the selector lever actuation. It can be provided here that the driver's wish be detected by the approximation or contact of the selector lever, which can be used for immediately effecting the breaking off of the loading operation which, in turn, results in that the delay of the activation of a running step is extensively presented, since the electronic lock is switched off.

The inventive idea ensures that the driver's wish is implemented without delay whereby the operation of a vehicle having an electric accumulator 7 and a hybrid drive mechanism 13 including an engine 9 and an electric motor 11 becomes more user friendly and comfortable.

REFERENCE NUMERALS 1 selector lever
2 selector lever locking device
3 sensor device
4 electronic control
5 transmission

The invention claimed is:

1. A method for actuating a transmission of a motor vehicle having a hybrid drive mechanism in which an electric accumulator may be loaded via an internal combustion engine and during a loading operation a selector lever is electronically locked or mechanically locked via a selector lock, and a driver's wish concerning actuation of the selector lever is detected via a sensor device (3), the method comprising the steps of:

when it is determined by the sensor device (3) that a driver is about to activate a running step of the transmission, immediately discontinuing the loading operation, via the internal combustion engine, of the electric accumulator and adjusting an operating state which allows a safe activation of the running step of the transmission and subsequently one of terminating locking of the selector lever (1) or releasing a selector locking device (2).

2. An actuation device for actuating a transmission of a motor vehicle having a hybrid drive mechanism in which an electric accumulator may be loaded via an internal combustion engine and during a loading operation a selector lever is electronically locked or mechanically locked via a selector lock, and a driver's wish concerning actuation of the selector lever is detected via a sensor device (3), and upon determining, via the sensor device (3), that a driver is about to activate a running step of the transmission, the loading operation of the electric accumulator, via the internal combustion engine, is immediately discontinued and an operating state is adjusted which allows a safe activation of a transmission running step and subsequently, one of locking of the selector lever (1) is terminated or the selector locking device (2) is released, the actuation device comprising:

the sensor device (3) which is disposed parallel with the mechanical selector lever device (2) and senses the driver's wish concerning the selector lever actuation in spite of the locking of the selector lever (1) by the mechanical selector lever locking device (2) against activation of the running step of the transmission.

3. The actuation device according to claim 2, wherein the sensor device (3) is one of a motion sensor and a switch situated parallel with a mechanical unlocking knob of the selector lever device (2).

4. The actuation device for applying the method according to claim 2, wherein if the vehicle comprises an electronic selector lever lock, the electronic selector lever lock has one of optical and contact sensors, located relative to the selector lever actuation in a manner such that during one of approximate contact and contact of the selector lever, the driver's wish concerning the selector lever actuation is detected.

5. A method for actuating a transmission of a motor vehicle having a hybrid drive mechanism with an electric accumulator being loadable via an internal combustion engine and a selector lever being locked, either electronically or via a mechanical selector lock during a loading operation, the method comprising the steps of:

detecting, via a sensor device (3), a driver's wish concerning actuation of the selector lever;

discontinuing, via the internal combustion engine, the loading operation of the electric accumulator when the sensor device (3) detects that a driver is about to activate a running step of the transmission;

adjusting an operating state to allow a safe activation of the running step of the transmission; and one of terminating locking of the selector lever(1) and releasing a selector locking device (2).

6. The method for actuating a transmission according to claim 5, further comprising the steps of:

placing the sensor device (3) in parallel with the mechanical selector lever device (2) and sensing the driver's wish concerning actuation of the selector lever, in spite of the locking of the selector lever (1) by the mechanical selector lever locking device (2) against activation of the running step of the transmission, when the vehicle comprises the selector locking device (2).

7. The method for actuating a transmission according to claim 5, further comprising the step of using one of a motion sensor and a switch, situated in parallel with the mechanical unlocking knob of the selector lever device (2), as the sensor device (3).

8. The method for actuating a transmission according to claim 5, further comprising the step of, if the vehicle comprises an electronic selector lever lock, providing the electronic selector lever lock with at least one of optical and contact sensors such that during one of approaching contact and contact of the selector lever, the driver's wish concerning actuation of the selector lever actuation is detected.

\* \* \* \* \*